Dec. 13, 1966     P. F. BEISCHER     3,292,084
PHASE ROTATION INDICATOR
Filed Feb. 6. 1964     2 Sheets-Sheet 1
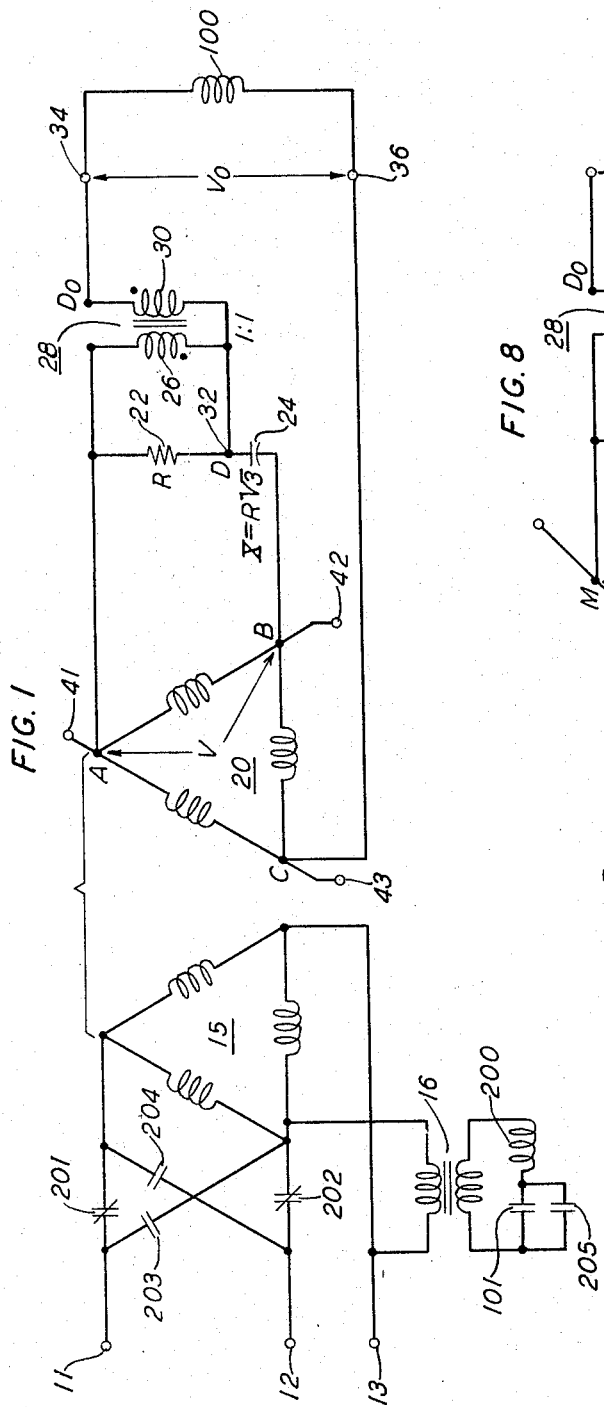
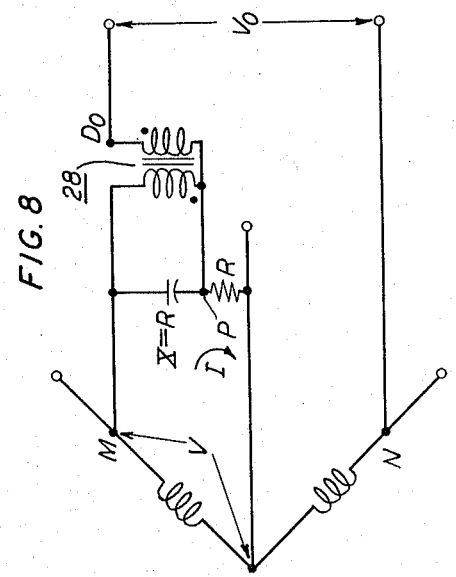
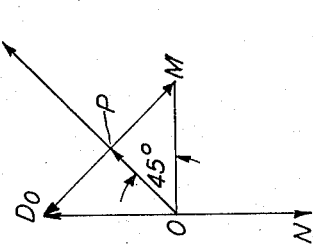
INVENTOR
PHILIP F. BEISCHER
BY
HIS ATTORNEY Dec. 13, 1966  P. F. BEISCHER  3,292,084
PHASE ROTATION INDICATOR
Filed Feb. 6, 1964  2 Sheets-Sheet 2

INVENTOR
PHILIP F. BEISCHER
BY

HIS ATTORNEY

United States Patent Office 3,292,084
Patented Dec. 13, 1966

3,292,084
PHASE ROTATION INDICATOR
Philip F. Beischer, Belleville, N.J., assignor to Air Reduction Company, Incorporated, New York, N.Y., a corporation of New York
Filed Feb. 6, 1964, Ser. No. 343,036
1 Claim. (Cl. 324—86)

This invention relates to a device or sensor for distinguishing between the two opposite directions of phase rotation in a polyphase electrical power system.

It has been found that there exist certain useful electrical systems which employ a polyphase power source for their energization and which will only operate properly and perform their function if the direction of phase rotation, that is, the order of succession of the individual phases of the polyphase source in attaining their successive values, e.g., their successive maximum values, is in a preferred order or a preferred direction of phase rotation. It is desirable to have a simple and reliable means of sensing which direction of phase rotation exists in a system and to provide means to switch the polyphase source over to the preferred direction of phase rotation if and when the direction of phase rotation is not the preferred one.

It is an object of the invention to simplify and make more reliable the structure and operation of a phase rotation direction sensing device.

A feature of the invention is a clear and unequivocal responsive from the device indicative of the actual direction of phase rotation existing in the polyphase system.

A specific feature is a substantially null response for one direction of phase rotation coupled with a material non-null response for the other direction of phase rotation.

In accordance with illustrative embodiments of the invention, a phase-splitting network of predetermined phase angle is connected in one phase of the polyphase electrical system; voltage reversing pick-up means of predetermined voltage ratio is connected across a portion of the phase-splitting network; and means is provided to compare a voltage from the pick-up means with a voltage at a point in another phase of the polyphase system to produce a difference voltage. The phase angle of the phase-splitting network and the voltage ratio of the pick-up means are so selected as to make the difference voltage substantially zero for one direction of rotation in the polyphase system and of a material non-null value for the opposite direction of phase rotation. The difference voltage may be used for any desired purpose, for example to actuate means to reverse the direction of phase rotation by changing phase connections in the polyphase system in such manner as to impress polyphase power upon a load circuit with a preferred direction of phase rotation in case the initial phase connections give a non-preferred direction of phase rotation.

Other objects, features and advantages will appear from the following more detailed description of illustrative embodiments of the invention, which will now be given in conjunction with the accompanying drawings.

In the drawings:

FIG. 1 is an electrical schematic diagram of an illustrative three-phase circuit embodying the invention;

FIG. 8 is an electrical schematic diagram of an illustrative quarter-phase system embodying the invention; and FIG. 9 is a vector diagram useful in explaining the operation of the system shown schematically in FIG. 8.

Figure 2:
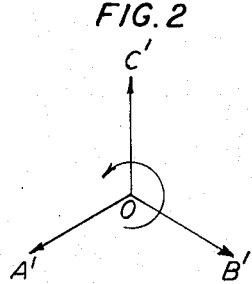
FIGS. 2, 3 and 4 are vector diagrams useful in explaining the operation for one direction of phase rotation in the circuit shown schematically in FIG. 1.

Referring to FIG. 1, terminals 11, 12 and 13 represent connections to a three-phase power source of any form, for example a commercial three-phase power line. The terminals 11, 12 and 13 are connected to a delta array 15 of transformer primary windings. Interposed between the terminals 11, 12 and the delta array 15 is a set of relay contacts 201, 202, 203, and 204, arranged to form the equivalent of a double-pole reversing switch. As shown in the figure, the contacts 201 and 202 are normally closed and the contacts 203 and 204 are normally open. The contacts are controlled by a relay winding 200 which is shown as being energizable by means of power from one phase of the power system through a transformer 16 and the primary winding of which is connected across one winding of the array 15. Energization of the relay winding 200 is under the control of another relay winding 100 which has a normally open contact 101 serially connected with the relay winding 200 across the secondary winding of the transformer 16. The relay winding 200 also controls a normally open self-holding contact 205 connected in parallel with the contact 101. The primary array 15 is coupled in the usual manner to an array 20 of delta connected power secondary windings of a three-phase power transformer, with secondary phase junctions or phase lines A, B and C and a phase voltage of amplitude V. Any other suitable three-phase source may be used instead of the delta arrangement shown. Across one phase, or across between two phase lines determining for example the phase AB, is connected a phase-splitting circuit branch comprising a resistor 22 of resistance value R, and a capacitor 24 of reactance value X. The reactance X is so chosen that, at the given power frequency, the reactance of the capacitor is $\sqrt{3}$ times the resistance R, thus producing a negative power factor angle of 60 degrees in the phase-splitting circuit branch. Across the resistor 22 there is connected the primary winding 26 of a one-to-one turns ratio transformer 28 having a secondary winding 30. The winding 30 has one terminal in common with one terminal of the winding 26. This common terminal is connected to the common terminal 32 of the resistor 22 and the capacitor 24. The non-common terminal of the winding 30 is connected to an output terminal 34 of the indicating or sensing device. The windings 26 and 30 of the transformer 28 are coupled to the transformer core in such polarity that the voltage induced in the winding 30 is the negative of the voltage across the winding 26, thereby insuring that the terminal 34 and the terminal A differ from the junction 32 always by equal and opposite voltages. The junction 32 is designated D and the terminal 34 is designated $D_0$. The phase junction or phase line C is connected to a terminal 36 and the output voltage $V_0$ of the device appears between terminals 34 and 36.

Power from the array 20 may be connected in any suitable manner to a three phase load circuit, as for example by connection to terminals 41, 42 and 43 which are connected respectively to the points A, B and C of the array 20. Utilization of power will generally have no deleterious effect upon the operation of the device shown herein for distinguishing between the two possible directions of phase rotation in the array 20.

In the operation of the circuit shown in FIG. 1, the voltage $V_0$ appearing between the points C and $D_0$ is greatly different depending upon the particular direction of phase rotation in the array 20. When the phase rotation is in the counterclockwise direction identified as ACB in FIG. 1, substantially no output voltage is produced and thus $V_o$ is zero. On the other hand, when the phase rotation is in the clockwise direction ABC, a definite and substantial output voltage is produced, which may be shown to be $\sqrt{3}V$ in amplitude. Thus the voltage $V_o$ may be used to indicate which direction of phase rotation is present at any given time or to actuate any suitable automatic apparatus to respond to the direction of rotation that exists. Examples of such usages include lighting a pilot to show one direction and extinguishing the light to show the other direction; actuating relays or any suitable devices to switch power line phase connections to automatically provide a preferred direction of rotation, etc.

To demonstrate how the circuit of FIG. 1 operates to distinguish the two directions of phase rotation, reference is now made to FIGS. 2-7.

Figure 3:
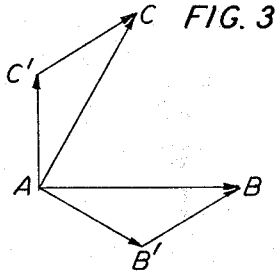
Figure 4:
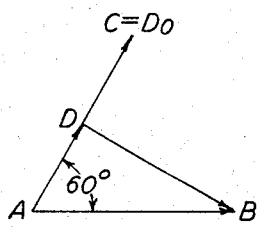

Referring first to FIGS. 2, 3 and 4, FIG. 2 shows the vector relationship existing at a given instant among the alternating current voltages at the phase points A, B and C in the circuit of FIG. 1. For reasons which will be evident when it comes to describing FIGS. 3 and 4, the vectors shown in FIG. 2 have their head points designated A', B' and C', corresponding respectively to the points A, B, and C in FIGS. 3 and 4. Assuming the conventional counterclockwise rotation of the vector diagram of FIG. 2 with the passage of time, FIG. 2 represents the phase succession ACB in FIG. 1. In FIG. 2, the origin of coordinates is at the point O. FIG. 3 shows a transformation of coordinates obtained by moving the origin to the point A'. The transformation may be effected in the usual manner by adding to each vector another vector of magnitude and direction indicated by the vector from A' to O. Point B' is thus transformed to a new point designated B in FIG. 3; point C' is transformed to C; and A' is transformed to O and renamed A, all as shown in FIG. 3. There is thus obtained a new vector diagram, repeated for clarity in FIG. 4, which represents the phase points A, B and C of FIG. 1 equally well as does the vector diagram of FIG. 2.

Referring now to FIG. 4, the voltage impressed across the phase points A and B of FIG. 1 is represented by the vector AB in FIG. 4. The vector of the resultant current in the phase-splitting circuit branch RX leads the voltage vector AB by 60 degrees, which brings this current vector to coincide in direction with the voltage vector AC. The vector for the voltage drop across the resistor is vector AD and the vector for the voltage drop across the capacitor is DB. The transformer 28 adds to the vector AD an equal vector DC, thus bringing the vector voltage at the point $D_o$ into coincidence with the vector AC. Thus, terminals 34 and 36 are always at substantially the same voltage (theoretically at exactly the same voltage) and no output voltage is found. In other words, $V_o$ is zero for the phase rotation order of ACB.

Figure 5:
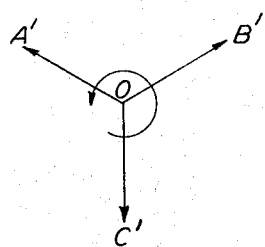
FIGS. 5, 6 and 7 are vector diagrams useful for explaining the operation of the same circuit for the opposite direction of phase rotation.

FIG. 5 shows the vector relationship existing at some given instant among the alternating currents voltages at the phase points A, B and C in the circuit of FIG. 1 for the phase succession ABC in FIG. 1.

Figure 6:
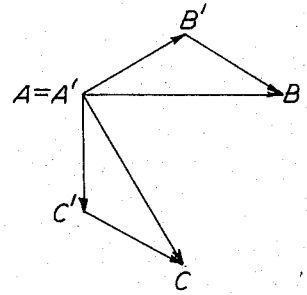
Figure 7:
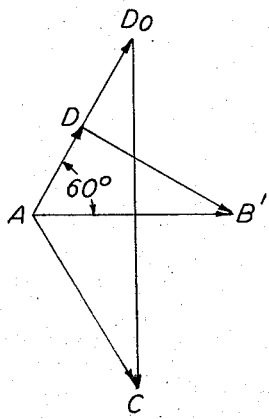

FIG. 6 shows a transformation of coordinates similar to that used in FIG. 3, which shifts the origin of coordinates to the point A'. A comparison of FIGS. 3 and 6 shows that when the vector AB extends horizontally from left to right then whereas in FIG. 3 the vector AC extends upwardly toward the right, in FIG. 6 on the other hand, the vector AC extends downwardly toward the right, which difference is at the heart of distinguishing between the two directions of phase rotation. As before, the output voltage is taken between the terminals 34 and 36, which correspond to the points $D_o$ and C respectively in the vector diagram. FIG. 7 corresponds which from calculation or from measurement on the vector AC for the phase rotation ABC. It is shown in FIG. 7 that the output voltage is not zero but has a substantial value as shown by the vector $D_oC$, the magnitude of which from calculation or from measurment on the vector diagram is found to be $\sqrt{3}V$, that is, $\sqrt{3}$ times the voltage of any one of the three phases in the array 20.

Given the circuits and mode of operation disclosed herein, one skilled in the art will be able to utilize the output voltage $V_o$ of the device for various purposes, for example to light or extinguish one or more pilot or signal lamps to show what is the direction of phase rotation in the array 20, to operate one or more relays to switch the primary power connections, or the secondary power connections to deliver to a work circuit power having a preferred direction of phase rotation, etc., with any desired degree or refinement of automatic operation.

The operation of the illustrative arrangement of relays 100 and 200 in FIG. 1 for the purpose of reversing the primary power line connections in case the order of phase rotation in the three-phase power line is the reverse of the desired order is as follows. It will be assumed that the preferred direction of phase rotation is the one which produces substantially no voltage across between the terminals 34 and 36. The relay winding 100 is shown connected across the terminals 34 and 36. Accordingly, if the phase rotation is in the preferred direction when the contacts 201 and 202 are closed, the relay winding 100 is not energized, contact 101 remains open, and relay winding 200 is not energized. The power line terminals 11 and 12 are connected to the primary array 15 by way of the contacts 201 and 202 as shown. If, however, the direction of phase rotation is initially the reverse of the preferred direction of phase rotation, a substantial voltage will appear across the terminals 34 and 36, thereby energizing the relay winding 100 and closing the contact 101. Relay winding 200 is immediately energized by way of the closed contact 101 and locks itself in energized condition by closing its contact 205. The relay winding also opens its contacts 201 and 202 and closes contacts 203 and 204, thereby reversing the connection of two of the phase connections to the primary array 15. The reversal of any two connections to the phase lines in a three-phase system causes a reversal in the direction of phase rotation as is well known. Upon this reversal of the direction of phase rotation, the voltage $V_o$ falls substantially to zero thereby de-energizing relay 100 and reopening contact 101 in the energizing circuit of relay winding 200. The winding 200 remains energized through the holding contact 205, thus preventing a reversal of the direction of phase rotation back to the original, non-preferred direction.

Commercial power supply lines are normally maintained with an invariable direction of phase rotation, in which case, the simple relay system illustrated in FIG. 1 is all that is needed. However, should a power source be used that is subject to reversals in direction of phase rotation a flip-flop device may be used which is not self-locking, as is relay winding 200, but which can be arranged in known manner to reverse the phase connections of the power source whenever a material voltage $V_o$ appears across the terminals 34, 36.

The system illustrated in FIG. 1 is particularly useful in portable equipment which may be connected to different power outlets of the same or of a different power source from time to time which power outlets may of course differ from one another in direction of phase rotation. When the system of FIG. 1 is disconnected from a power outlet, the voltage $V_o$ falls to zero and relay winding 100 if energized becomes de-energized, thereby opening contact 101. At the same time, the disconnection of the power de-energizes winding 200, thereby opening contact 205. The system is thus reconditioned for connection to another power outlet the direction of phase rotation of which may be either the preferred or the non-preferred direction. The system will then function again as described above to insure the establishment of the preferred direction of phase rotation in the load circuit.

FIG. 8 shows an illustrative connection for use in a quarter-phase system of two phases. The respective phases are shown at OM and ON. The phase-splitting circuit branch is shown connected across phase OM, with the resistor R having one terminal connected to phase terminal O, and the capacitor of reactance X having one terminal connected to the phase terminal M. The phase reversing transformer 28 is in this case connected across the capacitor instead of across the resistor. The voltage $V_o$ appears between the transformer terminal $D_o$ and the phase terminal N. The reactance X, in this case is made equal to the resistance of R, giving a 45 degree phase angle in the phase-splitting circuit branch.

The operation of the circuit of FIG. 8 will be evident from the vector phase diagram shown in FIG. 9 for the circuit. The current I in the phase-splitting circuit branch leads the phase voltage OM by 45 degrees. Because X and R are numerically equal, the voltage OP across the resistor is equal in amplitude to the voltage PM across the capacitor and the phase reversed capacitor voltage $PD_o$ is in the proper phase and amplitude to bring $D_o$ into coincidence with the reverse of the phase voltage ON. So, as in the system of FIG. 1, $V_o$ is zero for one direction of phase rotation and of substantial non-null value for the other direction of phase rotation.

It will be evident to those skilled in the art that the invention is not limited in its application either to a three phase sysem or to a quarter phase system but may be extended to other numbers of phases. In any case, the phase-splitting circuit branch is to be connected in one phase and the output voltage is to be taken off between some point in the phase-splitting circuit branch and some point in another phase.

In general, it will be necessary to select a suitable phase angle for the phase-splitting circuit branch and a suitable value of turns ratio in the transformer 28 to bring the voltage at the point $D_o$ to equality with one of the phase voltages.

While illustrative forms of apparatus and methods in accordance with the invention have been described and shown herein, it will be understood that numerous changes may be made without departing from the general principles and scope of the invention.

I claim as my invention:

In a phase rotation direction sensor for a polyphase electrical system, in combination,
- (a) a two element phase splitting network connected across a first phase of said polyphase system,
- (b) said network splitting the phase voltage into components of determined phase relationship,
- (c) voltage sensing and reversing means connected across one element of said network,
- (d) said sensing and reversing means having a unity input to output voltage magnitude ratio,
- (e) voltage summation means having input means with said input connected across the output of said sensing means and a phase voltage adjacent to said first phase,
- (f) said summation means responsive to the magnitude of voltages at its input,
- (g) said determined phase relationship so selected that said input voltage to the comparison means will be substantially zero for one direction of phase rotation in said polyphase system and of a material non null value for the opposite direction of phase rotation.

References Cited by the Examiner

UNITED STATES PATENTS

| | | | |
|---|---|---|---|
| 1,674,477 | 6/1928 | May | 317—27 X |
| 2,486,004 | 10/1949 | Clark | 324—86 X |
| 2,724,782 | 11/1955 | Holloway | 307—127 |
| 2,816,265 | 12/1957 | Chamberlain | 324—86 |
| 2,836,771 | 5/1958 | Jessee | 317—47 |
| 2,854,631 | 9/1958 | Annich et al. | 324—83 X |
| 2,914,703 | 11/1959 | Clark | 324—86 X |
| 2,975,334 | 3/1961 | Callan | 324—86 X |
| 3,188,522 | 6/1965 | Culbertson | 324—86 X |
| 3,214,664 | 10/1965 | Ishikawa | 307—127 X |
| 3,215,865 | 11/1965 | Grimme | 317—47 |

WALTER L. CARLSON, *Primary Examiner.*

P. F. WILLE, *Assistant Examiner.*

UNITED STATES PATENT OFFICE
CERTIFICATE OF CORRECTION

Patent No. 3,292,084　　　　　　　　　　　　　　December 13, 1966

Philip F. Beischer

It is hereby certified that error appears in the above numbered patent requiring correction and that the said Letters Patent should read as corrected below.

Column 3, lines 72 and 73, strike out "corresponds which from calculation or from measurement on" and insert instead -- corresponds to FIG. 4 but with the appropriate showing of --.

Signed and sealed this 7th day of November 1967.

(SEAL)
Attest:

Edward M. Fletcher, Jr.
Attesting Officer

EDWARD J. BRENNER
Commissioner of Patents